US012423487B2

(12) United States Patent
Xue et al.

(10) Patent No.: US 12,423,487 B2
(45) Date of Patent: Sep. 23, 2025

(54) MULTI-LOCATIONAL FORECAST MODELING IN BOTH TEMPORAL AND SPATIAL DIMENSIONS

(71) Applicant: International Business Machines Corporation, Armonk, NY (US)

(72) Inventors: Zhengliang Xue, Yorktown Heights, NY (US); Bhavna Agrawal, Armonk, NY (US); Anuradha Bhamidipaty, Yorktown Heights, NY (US); Yingjie Li, Chappaqua, NY (US); Shuxin Lin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 17/458,728

(22) Filed: Aug. 27, 2021

(65) Prior Publication Data
US 2023/0073564 A1    Mar. 9, 2023

(51) Int. Cl.
*G06F 30/20*       (2020.01)
*G06Q 40/06*       (2012.01)
*G06F 111/04*      (2020.01)

(52) U.S. Cl.
CPC .......... *G06F 30/20* (2020.01); *G06F 2111/04* (2020.01); *G06Q 40/06* (2013.01)

(58) Field of Classification Search
CPC ...... G06F 30/20; G06F 18/2185; G06F 18/22; G06F 21/6254; G06F 16/2264; G06F 16/245; G06F 17/11
See application file for complete search history.

(56) References Cited

U.S. PATENT DOCUMENTS 6,625,569 B2    9/2003  James et al.
7,461,045 B1    12/2008 Chaovalitwongse et al.
(Continued)

FOREIGN PATENT DOCUMENTS

CA    2 820 129 A1     6/2012
CN    109034905 A      12/2018
(Continued)

OTHER PUBLICATIONS

Ta, et al., "Portfolio Optimization-Based Stock Prediction Using Long-Short Term Memory Network in Quantitative Trading", Jan. 7, 2020, pp. 1-20, vol. 10, Applied Sciences.
(Continued)

*Primary Examiner* — Rehana Perveen
*Assistant Examiner* — John David Hagler
(74) *Attorney, Agent, or Firm* — Scully, Scott, Murphy & Presser, PC; Michael A. Petrocelli, Esq.

(57) ABSTRACT

Temporal and spatially integrated forecast modeling includes generating a plurality of forecast models for a plurality of short-term to long-term time periods for a plurality of locations. Temporally integrating the plurality of forecast models sequentially over the plurality of time periods for the plurality of locations and spatially integrating the temporally integrated plurality of forecast models for each location hierarchically over the geographic areas. The forecast models are autoregressive distributed lag models with different explanatory variables for the short-term and long-term forecast models. The temporally integrating includes recursively integrating the plurality of forecast models over the time periods from the short-term to the long-term time periods and the spatially integrating includes recursively integrating the temporally integrated plurality of forecast models hierarchically from larger size geographic areas to smaller size geographic areas. The method includes
(Continued)

optimizing the resultant spatially and temporally integrated forecast model based on a plurality of constraints.

20 Claims, 6 Drawing Sheets

(56) References Cited

U.S. PATENT DOCUMENTS

| | | | |
|---|---|---|---|
| 8,260,738 | B2 | 9/2012 | MacLennan et al. |
| 8,352,355 | B2 | 1/2013 | Ettl et al. |
| 10,496,927 | B2 | 12/2019 | Achin et al. |
| 11,250,449 | B1 | 2/2022 | Bledsoe et al. |
| 11,841,480 | B2 * | 12/2023 | Jiang ............... G01S 13/86 |
| 2008/0097701 | A1 | 4/2008 | Zawadzki et al. |
| 2008/0167942 | A1 | 7/2008 | Ameniya et al. |
| 2009/0319295 | A1 * | 12/2009 | Kass-Hout ............. G16H 50/80 |
| | | | 707/999.102 |
| 2010/0082442 | A1 * | 4/2010 | Ma ................... G06Q 30/0603 |
| | | | 705/14.73 |
| 2013/0325347 | A1 | 12/2013 | Giorgetti et al. |
| 2014/0289004 | A1 * | 9/2014 | Monforte ........... G06Q 30/0202 |
| | | | 705/7.31 |
| 2015/0104064 | A1 | 4/2015 | Guissin et al. |
| 2015/0287141 | A1 | 10/2015 | Parker, Jr. |
| 2016/0140583 | A1 | 5/2016 | Ameniya et al. |
| 2017/0024821 | A1 | 1/2017 | Sherman |
| 2017/0116624 | A1 | 4/2017 | Moore et al. |
| 2018/0005319 | A1 | 1/2018 | Ettl et al. |
| 2021/0272027 | A1 * | 9/2021 | Haji Soleimani .. G06Q 30/0201 |
| 2021/0312488 | A1 | 10/2021 | Wick |
| 2024/0220855 | A1 | 7/2024 | Xue et al. |

FOREIGN PATENT DOCUMENTS

| | | | | |
|---|---|---|---|---|
| CN | 109242142 | B1 | 1/2019 | |
| CN | 110599234 | A | 12/2019 | |
| JP | 2021108121 | A * | 7/2021 | ............. G01W 1/10 |
| KR | 10-2022-0076012 | A | 6/2022 | |
| KR | 10-2423530 | B1 | 7/2022 | |
| WO | 2013/171746 | A9 | 11/2013 | |
| WO | 2020/263070 | A1 | 12/2020 | |

OTHER PUBLICATIONS

"Mixed Models—Random Coefficients," [online] NCSS Statistical Software © 2022 NCSS, Mixed Models in NCSS, Chap. 223, [retrieved Dec. 29, 2022], retrieved from the Internet: <https://www.ncss.com/wp-content/themes/ncss/pdf/Procedures/NCSS/Mixed_Models-Repeated_Measures.pdf>, 20 pg.

"System and Method for Analytics-Driven Sales Revenue Prediction," [online] IP.com Prior Art Database, Technical Disclosure IPCOM000239438D, Nov. 7, 2014, 17 pages.

Aviv, Y., "A time-series framework for supply-chain inventory management," Operations Research, Apr. 2003, vol. 51, No. 2, 4 pages.

Mell, P. et al., The NIST Definition of Cloud Computing, National Institute of Standards and Technology, U.S. Dept. of Commerce, Special Publication 800-145, Sep. 2011, 7 pg.

Subramanian, S. et al., "Demand modeling in the presence of unobserved lost sales," Management Science, Jun. 2021, vol. 67, No. 6, 3803-33, 46 pg.

* cited by examiner

| Variable X | Variable Names | Data Category |
|---|---|---|
| national-cagr-forecast<br>prior-yr-national-cagr-forecast | 3-Yr National CAGR Forecast<br>Prior Year National CAGR Forecast | National Forecast<br>National Forecast |
| cagr-prior-yr<br>cagr-2yr-ago<br>cagr-3yr-ago | CAGR Acceleration 1yr Lag<br>CAGR Acceleration 2yr Lag<br>CAGR Acceleration 3yr Lag | Auto Regression<br>Auto Regression<br>Auto Regression |
| GDP-growth<br>core-industry-share<br>crimes-per-capita<br>share-of-educated-population<br>income-growth | local GDP growth rate<br>Core Industry Share<br>Crimes per Capita<br>Share of Educated Population<br>Median Income Growth | Social-Economy<br>Social-Economy<br>Social-Economy<br>Social-Economy<br>Social-Economy |
| migration-growth<br>tourist-growth-util-prior-yr<br>tourist-growth-util-2yr-ago<br>tourist-growth-util-3yr-ago | Migration Growth Rate<br>Tourism Growth 1yr Lag<br>Tourism Growth 2yr Lag<br>Tourism Growth 3yr Lag | City Demand<br>City Demand<br>City Demand<br>City Demand |
| growth-from-flight<br>hotel-room-growth<br>office-vacancy<br>growth-of-entertainment-space | Flight Growth<br>Hotel Rooms Construction Rate<br>Office Vacancy<br>Entertainment Space Growth | City Supply<br>City Supply<br>City Supply<br>City Supply |

FIG. 3

| City | Region | 1-yr forecast | 2-yr forecast | 3-yr forecast | 4-yr forecast | 5-yr forecast |
|---|---|---|---|---|---|---|
| City 1 | Region 1 | 2.10% | 2.34% | 2.054% | 1.48% | 1.02% |
| City 2 | Region 1 | 1.99% | 1.87% | 1.57% | 1.18% | 0.74% |
| City 3 | Region 1 | 1.79% | 1.64% | 1.35% | 0.97% | 0.54% |
| City 4 | Region 1 | 2.12% | 2.37% | 2.06% | 1.46% | 0.97% |
| City 5 | Region 2 | 1.08% | 1.25% | 1.55% | 1.12% | 0.78% |
| City 6 | Region 2 | 1.51% | 1.79% | 2.11% | 1.50% | 1.04% |
| City 7 | Region 2 | 1.21% | 1.47% | 1.83% | 1.20% | 0.73% |
| City 8 | Region 2 | 1.36% | 1.59% | 1.93% | 1.38% | 0.97% |
| City 9 | Region 2 | 1.16% | 1.29% | 1.54% | 1.14% | 0.81% |

FIG. 4

MULTI-LOCATIONAL FORECAST MODELING IN BOTH TEMPORAL AND SPATIAL DIMENSIONS

BACKGROUND

This disclosure is directed to forecast modeling, and more particularly to computers, computer applications, and computer-implemented methods and systems for multi-locational forecasting in both temporal and spatial dimensions.

Both long-term and short term forecasting is needed to forecast market conditions in many industries such as commercial and residential real estate and global supply chain network investment. For example, real estate investment strategies need a forecast on the long-term capital return. Long term forecasting needs at least five years to be useful, however, market performance will be very different in different years, particularly if there is an economy cycle involved. For example, construction typically needs at least a two to three year forecast that considers risks and opportunities with long construction lead-times in multiple locations.

Short-term forecasting is also needed for either strategic or operations decisions. Timing of the breaking/turning point of an economy cycle or impact of natural disasters must be considered for annual operational decisions. Some signals/variables that are useful in the short term forecast may not be statistically significant in the long-term forecast. Some simple forecasting models such as ARIMA, in which the forecasting horizon can be easily extended in a rolling manner, cannot provide an accurate forecast in most of the industries, because both short and long term forecasts are based on the same set of autoregressive variables.

Geographical location is also important as local forecasts will impact the investment portfolio management. Market performance is highly differentiated in local markets. For example, there may be positive returns in a few locations even in a year in which returns in most areas are down.

Funding availability will dynamically change in terms of short-term returns and become a constraint of long-term investment. However, Current forecasting models do not provide optimization based on the consistent forecasting results in both temporal and spatial dimensions.

SUMMARY

One embodiment of a computer implemented method for forecast modeling includes the step of generating a plurality of forecast models for a plurality of time periods, in which the time periods include short-term and long-term time periods. Each forecast model of the plurality of forecast models is for a different time period for a plurality of locations. The locations include a plurality of geographic areas grouped hierarchically based the geographic size of the areas. The method further includes temporally integrating the plurality of forecast models sequentially over the plurality of time periods for the plurality of locations and spatially integrating the temporally integrated plurality of forecast models for each location hierarchically over the geographic areas to generate a resultant spatially and temporally integrated forecast model.

In one embodiment, the plurality of forecast models are generated based on a set of variables in a general forecasting model, such as an autoregressive distributed lag model (ARDL), which may have different explanatory variables for the short-term forecast models and for the long-term forecast models. In one embodiment, the temporally integrating includes recursively integrating the plurality of forecast models over the time periods from the short-term to the long-term time periods. In one embodiment, the spatially integrating includes recursively integrating the temporally integrated plurality of forecast models hierarchically from larger size geographic areas to smaller size geographic areas. In one embodiment, the method includes optimizing the resultant spatially and temporally integrated forecast model based on a plurality of constraints.

A computer system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 is a table showing of one example of the number and types of ARDL explanatory variables.

FIG. 4 is a table showing an example output of a resultant spatially and temporally integrated forecast model.

DETAILED DESCRIPTION

In one embodiment, a forecast modeling system and method is disclosed that integrates forecast models along the temporal dimension, such as for a plurality of time periods extending from the short-term to the long-term and integrates the temporally integrated forecast models across the spatial dimension, such as hierarchically over a plurality of geographic locations, for example, local, regional, national and global, to generate a resultant spatially and temporally integrated forecast model. The resultant spatially and temporally integrated forecast model is a forecast for the plurality of locations in the plurality of time periods.

Figure 1:
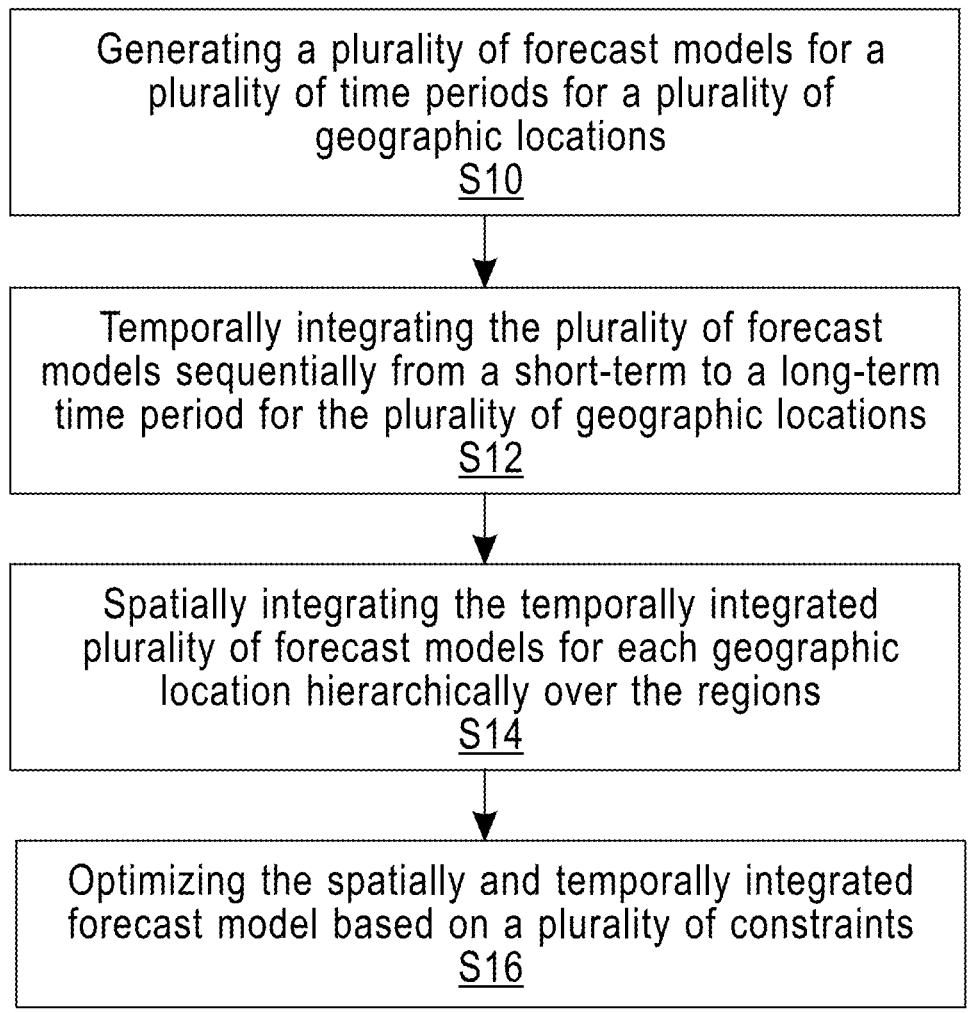
FIG. 1 is a flow diagram of one embodiment of the method disclosed in this specification.

FIG. 1 is a flow diagram of one embodiment of a method of forecast modeling that includes step S10 of generating a plurality of forecast models for a plurality of time periods. The time periods include both short-term and long-term time periods. In one embodiment, each forecast model of the plurality of forecast models is for a different time period for a plurality of geographic locations that include a plurality of regions that are hierarchically defined based the geographic size of the regions.

Step S12 includes temporally integrating the plurality of forecast models sequentially from a short-term to a long-term time period for the plurality of geographic locations. In one embodiment, the temporal forecasting models are integrated in a nested manner such that the short-term forecasting output can be used as an input into the mid-term forecast model, and the mid-term forecast model is used as input to the long-term forecast model, in order to gauge the forecasting results along the temporal dimension.

Step S14 includes spatially integrating the temporally integrated plurality of forecast models for each geographic location hierarchically over the regions to generate a resultant spatially and temporally integrated forecast model.

In one embodiment, in the spatial dimension, weights are assigned in a hierarchical way from global to national to regional to local areas. In one embodiment, the hierarchical integration is performed in the spatial dimension iteratively. In one embodiment, grouping the locations such as cities and regions hierarchically may enable a segmentation analysis.

The resultant spatially and temporally integrated forecast model generates forecasting results in both the temporal and spatial dimension thereby providing consistent forecasts for all of the plurality of geographic locations for each of the time periods. For example, the resultant spatially and temporally integrated forecast model may predict long, median and short term investment gain periods for different geographical regions. Because the integration of forecasting models takes place in both spatial and temporal dimension, the resultant spatially and temporally integrated forecast model can be applied to study the long-term investments in multiple locations and thereby optimize portfolio gains across multiple locations. Therefore, the resultant spatially and temporally integrated forecast model provides a consistent forecast across different time scale and geographic scope. In one embodiment, the resultant spatially and temporally integrated forecast model provides consistency in the temporal dimension and in the spatial dimension with different sets of explanatory variables in each dimension using autoregressive distributed lag models.

In one embodiment, the resultant spatially and temporally integrated forecast model can provide real-time feedback by automatically synchronizing all the forecast results in the spatial and temporal dimensions, so that if any forecast changes in any level from short-term to long-term, from local to global, the resultant spatially and temporally integrated forecast model will reflect such changes. For example, changes may occur due to regular update of the sensors data or a planned event, while some unscheduled events will affect the long-term and some may not. Therefore, the resultant spatially and temporally integrated forecast model results may provide both the expected return and the risks correspondingly.

In one embodiment, the resultant spatially and temporally integrated forecast model can optimize the decisions in time and also across multiple locations. In one embodiment, dynamic portfolio optimization takes into account various constraints, such as, the constraints of funding and construction lead-times in real estate investment, whereas the prior art forecast models do not take into account such constraints and concerns. Step S16 in FIG. 1 is an optional step for optimizing the resultant spatially and temporally integrated forecast model based on a plurality of constraints.

In one embodiment, the resultant spatially and temporally integrated forecast model continues to optimize the investment portfolio based on the integrated forecasting results in a spatio-temporal network over time. In one embodiment, an optimization system to support the real-estate investment, based on the resultant spatially and temporally integrated forecast model for a portfolio of investment strategies, may include leasing, joint venture, ownership, etc. The optimized resultant spatially and temporally integrated forecast model will provide balancing of the short-term and long-term returns together with forecasted revenue flow along the timeline and balancing the returns and risks across multiple locations.

In one embodiment, the resultant spatially and temporally integrated forecast model can provide capital gain forecasting that allows for strategic investment over a business cycle, which is an improvement over the prior art models that provide demand forecasting of short-term revenue/profit optimization.

In one embodiment, the resultant spatially and temporally integrated forecast model provides dynamic portfolio optimization integrated with revenue forecast across multiple periods so that the expected revenue will regulate the funding available to investment. For example, an event such as the pandemic may strongly limit the investment in an industry in the short-term. Portfolio optimization using the resultant spatially and temporally integrated forecast model under the constraints of funding and lead-time will determine the future revenue. Short-term forecast will foresee the expected funding in the near future and thereby the size of portfolio. In turn, the expected funding will affect the overall capital return in the long-term. Thus, the resultant spatially and temporally integrated forecast model provides portfolio optimization with multiple options in a geographic network.

Figure 2:
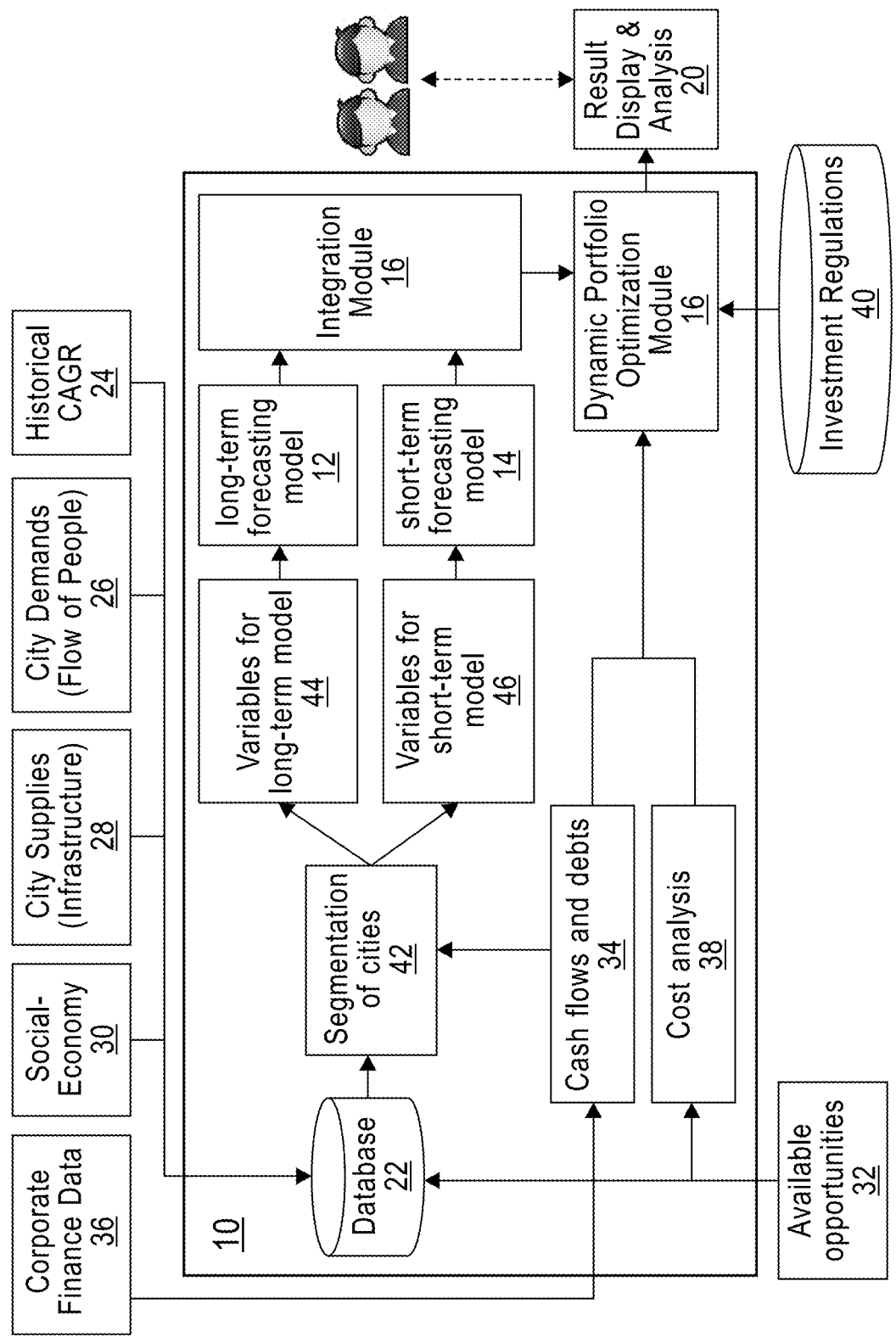
FIG. 2 is a block diagram of one embodiment of the system disclosed in this specification.

FIG. 2 is a block diagram of one embodiment of a forecast modeling system 10 for implementing the method of integrating forecasting models in both spatial and temporal dimensions. The modeling system 10 includes a long-term forecasting model 12 and a short-term forecasting model 14. The long-term forecasting model 12 generates a plurality of forecast models for a plurality of long-term time periods such as, for example, four to five years for a plurality of geographic locations, the geographic locations including a plurality of regions defined hierarchically based the geographic size of the regions. The short-term forecasting model 14 generates a plurality of forecast models for a plurality of short-term time periods such as, for example, one to three years for the plurality of geographic locations.

Integration module 16 temporally integrates the plurality of long-term and short-term forecast models 12 and 14 sequentially over the plurality of time periods for the plurality of geographic locations. For example, the forecast models 12 and 14 may be integrated from short-term to long-term, such as from year one to year five. The integration module 16 then spatially integrates the temporally integrated plurality of forecast models for each geographic location hierarchically over the regions to generate a resultant spatially and temporally integrated forecast model. For example, the temporally integrated plurality of forecast models may be integrated from larger to smaller regions, such as, state to city to county, or nation to state to city.

Dynamic portfolio optimization module 18 applies constraints to the resultant spatially and temporally integrated forecast model for optimizing decisions using on the integrated forecast model. In module 20, the results of the spatially and temporally integrated forecast model are analyzed and displayed to the user. Optimization module 18 is an optional module as results of the spatially and temporally integrated forecast model may be directly displayed from module 16.

The forecast modeling system 10 includes database 22 that stores information input to the long-term and short-term forecasting models 12 and 14. For example, in one embodiment for forecasting for real estate investment decisions, the input data may include historical compound annual growth rate (CAGR) 24, city demand (e.g., tourists, migration, etc.) 26, city supply (e.g., construction, etc.) 28, and social and economy data 30 that may include macro and micro economy data. Also stored in database 22 are available opportunities 32 (e.g., land price, etc.).

In one embodiment, inputs for optimization module 18 may include cash flow and debt/loans data obtained from corporate finance data 36 and cost analysis data 38 of the available opportunities 32. Cost analysis data 38 may include cost of existing projects. Investment regulations may also be input as the constraints to optimization module 18.

The data stored in database 22 is input to segmentation module 42. In segmentation module 42, the locations from which the data stored in database 22 is obtained from includes a plurality of locations that include a plurality of geographic areas grouped hierarchically based the geographic size of the areas. For example, the hierarchical grouping of areas in the United States may include cities and regions such as a state and the nation. The hierarchical grouping allows for the spatial integration of the forecasting models and enables segmentation analysis of the results. In one embodiment, the cash flows and debts data 34 is also input to the segmentation module 42 where the land cost can be used as an attribute to enhance the segmentation analysis.

The segmented data from module 42 is input to modules 44 and 46. Module 44 formulates and determines the variables for the long-term forecast model 12 and module 46 formulates and determines the variables for the short-term forecast model 14. In one embodiment the short-term and long-term forecast models 12 and 14 are autoregressive distributed lag (ARDL) models. A distributed lag model is a model for time series data in which a regression equation is used to predict current values of a dependent variable based on both the current values of an explanatory variable and the lagged (past period) values of this explanatory variable.

Below is shown the equations for an ADL model to forecast CAGR, where Y is the dependent variable CAGR and $X_1$ to $X_n$ are the explanatory variables.

1-year CAGR forecast at the end of time period t, in any location i:

$$Y_{t+1}^i = f_1^i(Y_t^i, Y_{t-1}^i, \ldots, Y_{t-l_1}^i; X_{1,t}^i, \ldots,$$
$$X_{1,t-l_1}^i; \ldots; X_{n_1,t}^i, \ldots, X_{n_1,t-l_{n_1}}^i)$$

2-year CAGR forecast at the end of time period t, in any location i:

$$Y_{t+2}^i = f_2^i(Y_t^i, Y_{t-1}^i, \ldots, Y_{t-l_2}^i; X_{1,t}^i, \ldots,$$
$$X_{1,t-l_2}^i; \ldots; X_{n_2,t}^i, \ldots, X_{n_2,t-l_{n_2}}^i)$$

τ-year CAGR forecast at the end of time period t, in any location i:

$$Y_{t+\tau}^i = f_\tau^i(Y_t^i, Y_{t-1}^i, \ldots, Y_{t-l_\tau}^i; X_{1,t}^i, \ldots,$$
$$X_{1,t-l_\tau}^i; \ldots; X_{n_\tau,t}^i, \ldots, X_{n_\tau,t-l_{n_\tau}}^i)$$

Location is indexed by i, for any nation/region/city, in the superscript of any variable. Time is indexed by t, in the subscript of any variable. Autoregressive variables may have different time lags ($l_1 \neq l_2 \neq \ldots \neq l_T$), where T is the maximum period. The number of explanatory variables (X) used in τ-year forecast is denoted by $n_\tau$, for $\tau=1, \ldots, T$. Different set of explanatory variables may be used from short-term and the long-term models ($n_1 \neq \ldots \neq n_T$). These models [0035] are independent and may give inconsistent forecasting results along the timeline. Consider a booming phase of economy, a one-year forecasting model may predict a 3% growth next year, and a two-year model may predict a 2% growth in the next two year. Such results mean an approximately 1% decline in the second year, which contradicts with the economic booming phase.

For example, the historical CAGR 24 may have different time lags for the short-term and long-term models. The social-economy data 30 may also have various time lags for the short-term and long-term models.

FIG. 3 is a table showing of one example of the number and types of explanatory variables X that can be determined from the historical CAGR data 24, city demand data 26, city supplies data 28 and the social-economy data 30.

Prior art forecasts along temporal dimension would have results as follows:

| | Example of inconsistent CAGR forecast: | | | |
|---|---|---|---|---|
| | 1-yr | 2-yr | 3-yr | 4-yr |
| Atlanta | 2.3% | 2.1% | 2.0% | −0.1% |
| Jacksonville | 1.9% | 2.0% | 2.0% | 1.4% |

Reasons for the inconsistent results may be cities may be in different segments where the regression coefficients are very different or different variable sets are used in the forecast of different time horizons (1-yr, 2-yr, etc.).

The integration module 16 integrates the forecast in a recursive way along the temporal dimension. Compared to the independent forecasting models in [0035], here, the 1-year forecast result becomes an explanatory variable in the 2-year forecast. Therefore, the forecasting models are formulated in a nested way, for example, from short to long time horizon as shown by the equations below:

1-year CAGR forecast at time t, in any location i:

$$\tilde{Y}_{t+1}^i = Y_{t+1}^i = f_1^i(Y_t^i, Y_{t-1}^i, \ldots, Y_{t-l_1}^i; X_{1,t}^i, \ldots,$$
$$X_{1,t-l_1}^i; \ldots; X_{n_1,t}^i, \ldots, X_{n_1,t-l_{n_1}}^i)$$

2-year CAGR forecast at time t, in any location i:

$$\tilde{Y}_{t+2}^i = \tilde{f}_2^i(Y_{t+1}^i, Y_t^i, Y_{t-1}^i, \ldots, Y_{t-l_2}^i; X_{1,t}^i, \ldots,$$
$$X_{1,t-l_2}^i; \ldots; X_{n_2,t}^i, \ldots, X_{n_2,t-l_{n_2}}^i)$$

τ-year CAGR forecast at time t, in any location i:

$$\tilde{Y}_{t+\tau}^i = \tilde{f}_\tau^i(\tilde{Y}_{t+\tau-1}^i, \ldots, \tilde{Y}_{t+1}^i; Y_t^i, Y_{t-1}^i, \ldots, Y_{t-l_T}^i;$$
$$X_{1,t}^i, \ldots, X_{1,t-l_\tau}^i; \ldots; X_{n_\tau,t}^i, \ldots, X_{n_\tau,t-l_{n_\tau}}^i)$$

Prior art forecasts are also inconsistent in spatial dimension.

| | Example of inconsistent CAGR forecast: | | | | |
|---|---|---|---|---|---|
| | 1-yr | 2-yr | 3-yr | 4-yr | |
| Region: Florida | 2.3% | 2.2% | 2.0% | 1.7% | regional |
| City 1: Jacksonville | 1.9% | 2.0% | 2.0% | 1.4% | forecast >> |
| City 2: Miami | 2.5% | 2.3% | 2.1% | 1.3% | average |
| City 3: Orlando | 2.4% | 2.2% | 1.9% | 1.1% | |

The reasons may be the regression models of national/regional forecasts are different from those of local forecasts and data history is typically longer in the national statistics than many locals.

Integration module 16 integrates forecast in a recursive way in the spatial dimension. Compared to the independent forecasting models in [0035], here, the t-year forecast result of a nation 0 becomes an explanatory variable in the τ-year forecast of any sub regions r. Similarly, the τ-year forecast result of any region r becomes an explanatory variable in the τ-year forecast of any of its sub regions i. Therefore, the forecasting models are formulated in a nested way, for example, top-down in the spatial dimension.

τ-year CAGR forecast in a nation indexed by 0:

$$\hat{Y}_{t+\tau}^0 = Y_{t+\tau}^0 = f_\tau^0(Y_t^0, Y_{t-1}^0, \ldots, Y_{t-l_t^0}^0; X_{1,t}^0, \ldots, X_{1,t-l_t^0}^0; \ldots; X_{n_\tau,t}^0, \ldots, X_{n_\tau,t-l_{n_\tau}^0}^0)$$

τ-year CAGR forecast in each region indexed by r:

$$\hat{Y}_{t+\tau}^r = \hat{f}_{t+1}^r(\hat{Y}_{t+\tau}^0; Y_t^r, Y_{t-1}^r, \ldots, Y_{t-l_t^r}^r; X_{1,t}^r, \ldots, X_{1,t-l_t^r}^r; \ldots; X_{n_\tau,t}^r, \ldots, X_{n_\tau,t-l_{n_\tau}^r}^r)$$

τ-year CAGR forecast in each local city indexed by i∈r:

$$\hat{Y}_{t+\tau}^i = \hat{f}_{t+1}^i(\hat{Y}_{t+\tau}^0, \hat{Y}_{t+\tau}^r; Y_t^i, Y_{t-1}^i, \ldots, Y_{t-l_t^i}^i; X_{1,t}^i, \ldots, X_{1,t-l_t^i}^i; \ldots; X_{n_\tau,t}^i, \ldots, X_{n_\tau,t-l_{n_\tau}^i}^i)$$

FIG. 4 is a table showing an example output of module 16 of the resultant spatially and temporally integrated forecast model for CAGR forecast in the future 1~5 years for 9 cities in 2 regions. In one embodiment, the resultant spatially and temporally integrated forecast model can be denoted by a sequence of vectors: $\vec{Y}_{t+1}, \ldots, \vec{Y}_{t+T}$ $\vec{Y}_{t+\tau}$ is a vector of τ-year forecast for 9 cities.

In one embodiment, a standard error of forecast can also be presented in a similar table to FIG. 4. The distribution of forecast errors can be tested and verified accordingly The optimization module 18 determines and applies variables for optimization of the forecast output result from module 16.

$\vec{Y}_{t+1}, \ldots, \vec{Y}_{t+T}$: is an example of the temporally and spatially integrated forecast for all the cities in the future T years input to module 18. Real market returns can be regarded as random variables around the forecast values.

Also input to module 18 may be decision variables and state variables. For example, in one embodiment:

$z_{t+1} \subseteq A_t$: new lands selected from the set of available lands at the end of period t, denoted by $A_t$ $Z_t$: existing portfolio (lands under investment) at the end of period t−1

$M_t$: net income in period t $\vec{B}_t = (B_{t,\xi_t}, \ldots, B_{0,\xi_0})$, where $B_{t,\xi_t}$ is the money borrowed in t and will be return after $\xi_t$ periods.

Dynamics or changes in the variables from period t to t+1 may be represented as:

$$Z_{t+1} = z_{t+1} \cup Z_t \text{ where } z_{t+1} \subseteq A_t$$

$$M_{t+1} = M_t + R_{t+1}(Z_t; \vec{Y}_{t+1}) - C_{t+1}(z_{t+1}, Z_t, \vec{B}_t)$$

$R_{t+1}(Z_t; \vec{Y}_{t+1})$ is the expected revenue generated by the existing lands $Z_t$ based on the forecast $\vec{Y}_{t+1}$ $C_{t+1}(z_{t+1}, Z_t, \vec{B}_t)$ is the cost of investment $z_{t+1}$, $Z_t$ and pay for the money borrowings $\vec{B}_t$ $$\vec{B}_{t+1} = (B_{t+1}, \vec{B}_t) = (B_{t+1}, B_{t,\xi_t}, \ldots, B_{0,\xi_0})$$

Matured date $\xi_{t+1}$ for $B_{t+1}$ will be selected to minimize the overall interests In one embodiment, the objective function $V_t(z; Z_t, M_t, \vec{B}_t)$ is total expected return after period t (from t+1 to t+T), for any new investment z.

The dynamic portfolio optimization module 18 will optimize the integrated forecast model to maximize total expected returns based on the decision and state variables as follows:

Where:

η is a time discount rate;

$V_{t+1}^*(Z_{t+1}, M_{t+1}, \vec{B}_{t+1})$ is the maximum total expected returns after period t+1 (from t+2 to t+T);

$R_{t+1}(Z_t; \vec{Y}_{t+1})$ is the revenue based on the existing lands $Z_t$ and market returns $\vec{Y}_{t+1}$ at the end of period C;

$C_{t+1}(z_{t+1}, Z_t, \vec{B}_t)$ is the cost based on the investment $z_{t+1}$, $Z_t$ and money borrowings $\vec{B}_t = (B_t, \ldots, B_0)$.

The optimization module 18 will also apply constraints. In one embodiment, the constraints may include: $z_{t+1} \in A_t$ and $$B_{t+1} = \max\{0, C_{t+1}(z_{t+1}, Z_t, \vec{B}_t) - E_{\vec{Y}_{t+1}} R_{t+1}(Z_t; \vec{Y}_{t+1}) - M_t\}.$$

If the available cash is more than the cost of investment and debt, then no loan is needed, that is $B_{t+1} = 0$.

The constraints may also include:

$$B_{t+1} \leq \overline{B}_{t+1}(M_t, \vec{B}_t).$$

$\overline{B}_{t+1}$ is the maximum borrowings in period t+1, conditional on $M_t$ and, $\vec{B}_t$.

Figure 5:
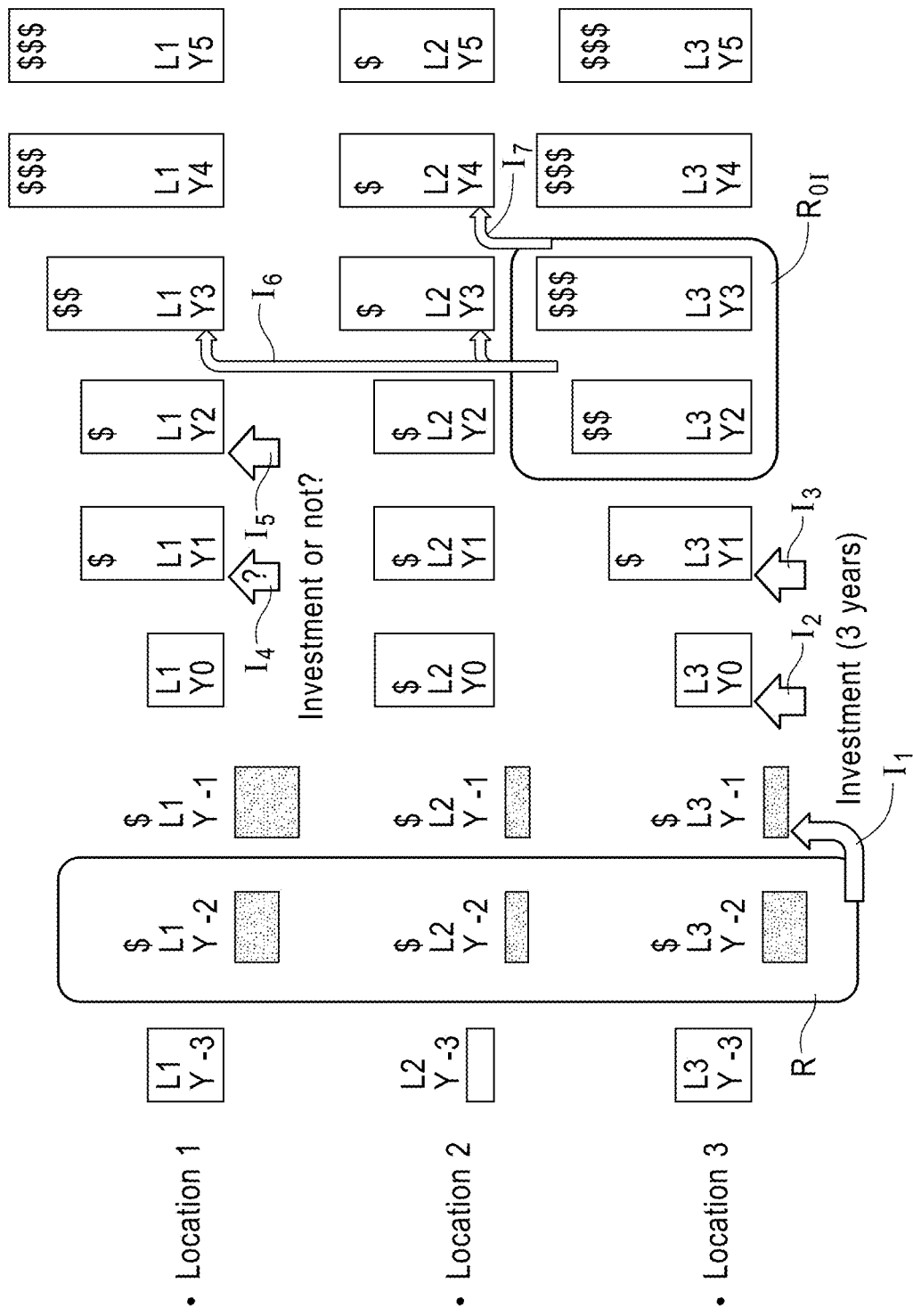
FIG. 5 is a table showing an example of the dynamics of the spatio-temporal investment decisions.

More financial constraints can be added on period t+2, ..., t+T, assuming $z_{t+2} = \ldots = z_{t+T} = 0$ FIG. 5 is a graph showing an example of the dynamics of the spatio-temporal investment decisions that can be made using the temporally and spatially integrated forecast model output from module 16 and optimized by module 18. There are three locations indexed by L1, L2 and L3 in the example. The current year is indexed by Y0 with historical data in the past three years indexed by Y−1, Y−2 and Y−3 respectively. The forecast is laid out in the next 5 years, indexed by Y1, Y2, ..., Y5. The height of the bars in each year shows the return of investment, where all the bars in years Y−2 and Y−1 are a negative return and the bars in years Y−3 and Y0-Y5 are a positive return. The returns in years Y−3, Y−2 and Y−1 were based on historical data whereas the returns in years Y0-Y5 are from the forecasting results. The recession R started two years ago (indexed by Y−2). At that moment, the investment $I_1$ was made in land 3, since it seemed to recover quicker than land 1 and 2 immediately after the recession. Such construction needs 3 years, so continuous investment $I_2$ and $I_3$ were made in years Y0 and Y1 and the return ROI will start after 2 years (in Y2). It seems that Y0 may not be a good year to invest, given a very tight budget due to the recession in the past two years and a project of land 3 right on the way. A decision maker needs to consider if any investment $I_4$ will go to location 1 and 2 in the coming year (Y1). The forecasting results show a good timing to invest location 1 in Y1, since a stronger return will come in Y4 and Y5 than that of location 2 based on the long-term forecast. Also, the firm's financial pressure of continuous investment $I_5$ and $I_6$ may not be tight in the years of Y2 and Y3, because an expected strong returns of location 1 will come in these years based on the short-term forecast.

Figure 6:
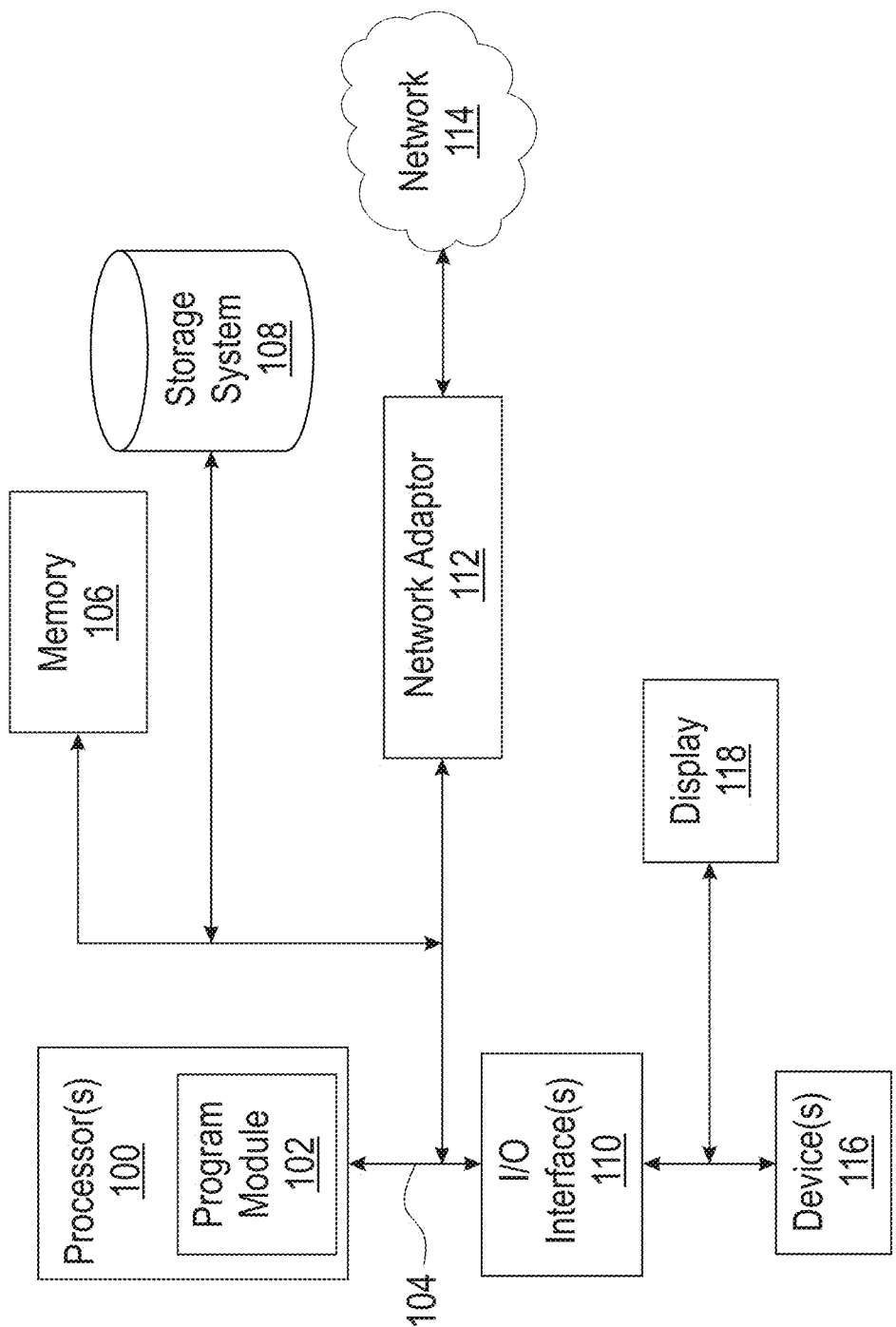
FIG. 6 is a block diagram of an exemplary computing system suitable for implementation of the embodiments of the invention disclosed in this specification.

FIG. 6 illustrates a schematic of an example computer or processing system that may implement the method of FIG. 1 and system of FIG. 2 for forecast modeling in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented forecast modeling method comprising:
generating a plurality of forecast models for a plurality of time periods, the time periods including short-term and long-term time periods, each forecast model of the plurality of forecast models being for a different time period for a plurality of geographic locations, the geographic locations including a plurality of geographic areas grouped hierarchically based the geographic size of the geographic areas;
temporally integrating the plurality of forecast models sequentially over the plurality of time periods for the plurality of locations; and
spatially integrating, by executing program instructions on a computer, the temporally integrated plurality of forecast models for each geographic location hierarchically over the geographic areas to generate a resultant spatially and temporally integrated forecast model;
generating, by the resultant spatially and temporally integrated forecast model, forecasting results in both the temporal and spatial dimensions; and displaying the forecasting results comprising forecasts for all of the plurality of geographic locations for each of the short-term and long-term time periods.

2. The computer implemented method of claim 1, wherein the plurality of forecast models are generated based on a set variables in an autoregressive distributed lag model.

3. The computer implemented method of claim 2, wherein the set of variables includes a first set variables for the short-term forecast models and a second set variables different from the first set for the long-term forecast models.

4. The computer implemented method of claim 1, wherein the temporally integrating comprises recursively integrating the plurality of forecast models over the time periods from the short-term to the long-term time periods.

5. The computer implemented method of claim 1, wherein the spatially integrating comprises recursively integrating the temporally integrated plurality of forecast models hierarchically from larger size geographic areas to smaller size geographic areas.

6. The computer implemented method of claim 1, further comprising automatically synchronizing the forecast results in the spatial and temporal dimensions, such that any forecast changes in any level from short-term to long-term, from local to global, the resultant spatially and temporally integrated forecast model will reflect such changes.

7. The computer implemented method of claim 1, further comprising optimizing the resultant spatially and temporally integrated forecast model based on a plurality of constraints.

8. A computer system for forecast modeling, comprising:
one or more computer processors;
one or more non-transitory computer-readable storage media;
program instructions, stored on the one or more non-transitory computer-readable storage media, which when implemented by the one or more processors, cause the computer system to perform the steps of:
generating a plurality of forecast models for a plurality of time periods, the time periods including short-term and long-term time periods, each forecast model of the plurality of forecast models being for a different time period for a plurality of geographic locations, the geographic locations including a plurality of geographic areas grouped hierarchically based the geographic size of the geographic areas;
temporally integrating the plurality of forecast models sequentially over the plurality of time periods for the plurality of locations; and
spatially integrating, by executing program instructions on a computer, the temporally integrated plurality of forecast models for each geographic location hierarchically over the geographic areas to generate a resultant spatially and temporally integrated forecast model;
generating, by the resultant spatially and temporally integrated forecast model, forecasting results in both the temporal and spatial dimensions; and
displaying the forecasting results comprising forecasts for all of the plurality of geographic locations for each of the short-term and long-term time periods.

9. The computer system of claim 8, wherein the plurality of forecast models are generated based on a set variables in an autoregressive distributed lag model.

10. The computer system of claim 9, wherein the set of variables includes a first set variables for the short-term forecast models and a second set variables different from the first set for the long-term forecast models.

11. The computer system of claim 8, wherein the temporally integrating comprises recursively integrating the plurality of forecast models over the time periods from the short-term to the long-term time periods.

12. The computer system of claim 8, wherein the spatially integrating comprises recursively integrating the temporally integrated plurality of forecast models hierarchically from larger size geographic areas to smaller size geographic areas.

13. The computer system of claim 8, further comprising automatically synchronizing the forecast results in the spatial and temporal dimensions, such that any forecast changes in any level from short-term to long-term, from local to global, the resultant spatially and temporally integrated forecast model will reflect such changes.

14. The computer system of claim 8, further comprising optimizing the resultant spatially and temporally integrated forecast model based on a plurality of constraints.

15. A computer program product comprising:
program instructions on a computer-readable storage medium, where execution of the program instructions using a computer causes the computer to perform a method for forecast modeling, comprising:
generating a plurality of forecast models for a plurality of time periods, the time periods including short-term and long-term time periods, each forecast model of the plurality of forecast models being for a different time period for a plurality of geographic locations, the geographic locations including a plurality of geographic areas grouped hierarchically based the geographic size of the geographic areas;
temporally integrating the plurality of forecast models sequentially over the plurality of time periods for the plurality of locations; and
spatially integrating, by executing program instructions on a computer, the temporally integrated plurality of forecast models for each geographic location hierarchically over the geographic areas to generate a resultant spatially and temporally integrated forecast model;
generating, by the resultant spatially and temporally integrated forecast model, forecasting results in both the temporal and spatial dimensions; and
displaying the forecasting results comprising forecasts for all of the plurality of geographic locations for each of the short-term and long-term time periods.

16. The computer program product of claim 15, wherein the plurality of forecast models are generated based on a set variables in an autoregressive distributed lag model, and wherein the set of variables includes a first set variables for the short-term forecast models and a second set variables different from the first set for the long-term forecast models.

17. The computer program product of claim 15, further comprising automatically synchronizing the forecast results in the spatial and temporal dimensions, such that any forecast changes in any level from short-term to long-term, from local to global, the resultant spatially and temporally integrated forecast model will reflect such changes.

18. The computer program product of claim 15, wherein the temporally integrating comprises recursively integrating the plurality of forecast models over the time periods from the short-term to the long-term time periods.

19. The computer program product of claim 15, wherein the spatially integrating comprises recursively integrating the temporally integrated plurality of forecast models hierarchically from larger size geographic areas to smaller size geographic areas.

20. The computer program product of claim 15, further comprising optimizing the resultant spatially and temporally integrated forecast model based on a plurality of constraints.

* * * * *